(No Model.)
J. L. CAHALAN.
PIPE.
No. 451,316.  Patented Apr. 28, 1891.
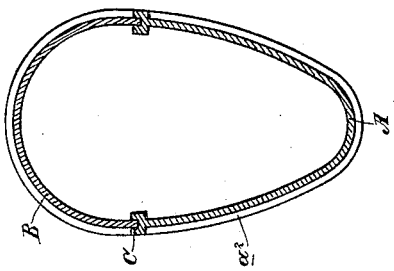
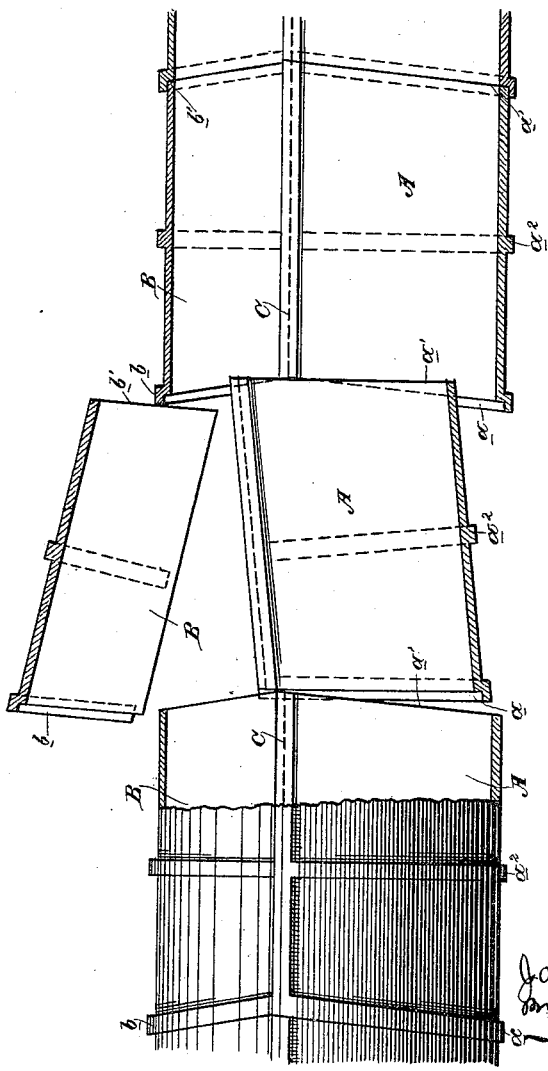
Witnesses,
Inventor,
John L. Cahalan
by Dewey & Co.
attys

UNITED STATES PATENT OFFICE.

JOHN L. CAHALAN, OF SAN FRANCISCO, CALIFORNIA.

PIPE.

SPECIFICATION forming part of Letters Patent No. 451,316, dated April 28, 1891.

Application filed February 24, 1891. Serial No. 382,654. (No model.)

*To all whom it may concern:*

Be it known that I, JOHN L. CAHALAN, a citizen of the United States, residing in the city and county of San Francisco, State of California, have invented an Improvement in Pipes; and I hereby declare the following to be a full, clear, and exact description of the same.

My invention relates to that class of pipes formed and adapted to be laid in sections, making a continuous course, way, or conduit for any purpose—such, for example, as sewers, water-ways, ditches, gutters, &c.

My invention consists in a pipe or way made of independent sections, each section having one flanged and one unflanged end, both ends being parallel and formed on a bevel—that is to say, on a plane inclined to the plane of its bottom and top.

My invention also consists of a pipe or way made in independent sections, each section consisting of two separable members, one above forming the cover and one below forming the main body of the pipe or way, each member having one flanged and one unflanged end, said ends in each being parallel and formed on a bevel, the bevel of the lower member being the reverse of the bevel of the upper member, all of which I shall hereinafter fully describe, and specifically point out in the claims.

The object of my invention is to provide a pipeway or conduit for general purposes—such as water-ways, sewers, ditches, gutters, &c.—made of independent sections, the peculiar construction of each section rendering it possible to form tight joints and at the same time to readily remove any section or a portion thereof for any purpose that may be required.

Referring to the accompanying drawings for a more complete explanation of my invention, Figure 1 is a part side elevation and longitudinal vertical section of my pipe, showing the members of one section being removed. Fig. 2 is a cross-section of my pipe.

The sections of the pipe are independent of one another, and each section in the case of a closed pipe consists of two members, the lower member, which forms the main body of the pipe, being designated by A, and the upper member, which forms the cover of the pipe, being designated by B. The members fit together by a suitable joint at C. The pipe may have any suitable shape in cross-section, square or other angular, circular or otherwise curved. I have here shown it as having an oval form, adapting it best for sewers. It may be made of any suitable material for the purpose desired—as, for example, terra-cotta for sewers.

The member A of each section has a flanged end $a$ and an unflanged end $a'$. It may also have a strengthening-rib $a^2$. The ends of this section are parallel with each other; but instead of being formed plumb—that is, at right angles with its top and bottom—they are formed in a plane inclined thereto or on a bevel, as shown. In laying these members together the unflanged end of one section fits into the adjacent flanged end of the next section, and the joint may be close as practicable for the particular use to which the pipe is intended to be put.

The novelty and advantage in this particular construction of the pipe-sections are these: The inclined or beveled ends of the sections so change the shape of the cross-section in contradistinction to what its shape would be if the ends were plumb that it becomes possible by a rolling action lengthwise to remove any one section from the line and to replace it again notwithstanding the flanged connections. This will be readily seen by observing any one section and imagining it to be lifted at its unflanged end through such an arc that it will turn about the bearings which the upper extremities of its flanged end find against the adjacent section. Now in this turning the flanged end removes from the plain end of the adjacent section, while the plain end of the moving section does not bind against the flanged end of its adjacent section, because of its incline or bevel which allows it to turn on an arc which does not at first intersect the plane of the adjacent section, so that the lower extremity of the plain end rises without touching the thickness of the adjacent section until it gets above it. Then on account of the small bevel shown and on account of the tapering or oval shape of the section the moving section when it does intersect the plane of the adjacent section will pass into it, its small portion fitting into the larger portion of the adjacent section. Thus the section may be rolled lengthwise out from the continuous line without any difficulty, and may be replaced in a similar way. This could not take place if the ends of the sections were plumb, for they could not be lifted perpendicularly on account of the flanges, and they could not be rolled out because the curve of movement of the moving section would intersect the plane of the next section immediately, and therefore clamp and bind; but on account of the bevel this removal can be accomplished. It is not necessary, however, for this removing action of any one section that it should move into the adjacent section. This is only an advantage where the sections are made tapering in cross-section, thereby allowing a much smaller bevel or incline to be employed; but in square or oblong angular cross-sections, where it is not possible for one section to roll into the other, they can still be removed by making the bevel very much greater, whereby at no part of its curved movement will the end of the moving section intersect the plane of the end of the adjacent section.

Thus far I have only described the lower member of the pipe, which for some purposes—as, for instance, for open water-ways, gutters, ditches, &c.—would be complete of itself; but for closed pipes—such as sewers—it is necessary to have the upper member B, and also necessary that this upper member be one which is readily removable both from the continuous line of upper members and each from its own lower member. This is because of the flange-joint, which, extending all the way around the complete pipe when the two members are used, renders it essential that one of them be first removed before the other one can be removed. The upper member resembles in form and general characteristics the lower member—that is to say, it has its ends parallel, one end *b* being flanged and the other end *b'* being unflanged, and said ends are on a bevel or formed at an incline to the plane of the bottom and top; but it differs from the lower member in that the inclination of its ends is in the reverse direction to the inclination of the ends of the lower member. Now with such a construction it is possible to readily remove any section of the line of upper members by the rocking action heretofore described and to replace it, and when removed the corresponding lower member may be readily removed, as heretofore described. It is therefore possible to lay a sewer the line of bottom members being of any length desired, and have them exposed to inspection before the top members are put on, and also to have their joints rendered thoroughly tight.

The upper member may be removed to get at any part of the sewer desired, and instead of having to cut into the sewer for branches any section may be taken out and one introduced having a branch outlet.

In making this shape of pipe from terra-cotta it may be necessary in the baking, in order to retain the shape, to employ a suitable clamp to hold the separated edges in position.

Having thus described my invention, what I claim as new, and desire to secure by Letters Patent, is—

1. Pipe-sections for forming a way or conduit which is composed of independent sections, each section having one end flanged and the other end unflanged to form the joints between the sections, said ends being parallel to each other and formed on a bevel or inclination to the plane of the top and bottom, substantially as and for the purpose herein described.

2. Pipe-sections for those ways, conduits, sewers, &c., which are composed of independent sections, each section consisting of an upper and a lower member detachable from each other and having one flanged and one unflanged end, each member having its ends parallel and formed on a bevel or inclination to the plane of its top and bottom, the inclination of the ends of one member being the reverse of the inclination of the ends of the other member, substantially as herein described.

In witness whereof I have hereunto set my hand.

JOHN L. CAHALAN.

Witnesses:
S. H. NOURSE,
J. A. BAYLESS.